United States Patent
Zaslavsky et al.

(10) Patent No.: US 9,256,884 B2
(45) Date of Patent: Feb. 9, 2016

(54) SYSTEM AND METHOD TO INCREASE EFFICIENCY AND SPEED OF ANALYTICS REPORT GENERATION IN AUDIENCE MEASUREMENT SYSTEMS

(75) Inventors: Eduard Zaslavsky, Issaquah, WA (US); Arthur Vaysman, San Jose, CA (US); Michael Kouts, Toronto (CA)

(73) Assignee: WebTuner Corp, Redmond, WA (US)

( * ) Notice: Subject to any disclaimer, the term of this patent is extended or adjusted under 35 U.S.C. 154(b) by 0 days.

(21) Appl. No.: 13/479,608

(22) Filed: May 24, 2012

(65) Prior Publication Data
US 2012/0304209 A1     Nov. 29, 2012

Related U.S. Application Data

(60) Provisional application No. 61/489,422, filed on May 24, 2011.

(51) Int. Cl.
| | |
|---|---|
| H04H 60/32 | (2008.01) |
| H04H 60/33 | (2008.01) |
| H04H 60/45 | (2008.01) |
| H04H 60/56 | (2008.01) |
| G06Q 30/02 | (2012.01) |
| H04H 60/27 | (2008.01) |
| H04H 60/41 | (2008.01) |

(52) U.S. Cl.
CPC .............. *G06Q 30/02* (2013.01); *H04H 60/27* (2013.01); *H04H 60/41* (2013.01)

(58) Field of Classification Search
None
See application file for complete search history.

(56) References Cited

U.S. PATENT DOCUMENTS

| | | | |
|---|---|---|---|
| 2,958,403 | A | 11/1960 | Robertson |
| 4,264,924 | A | 4/1981 | Freeman |
| 4,332,998 | A | 6/1982 | Boros |
| 4,381,522 | A | 4/1983 | Lambert |
| 4,426,629 | A | 1/1984 | Fouse |
| 4,529,006 | A | 7/1985 | Block et al. |
| 4,561,233 | A | 12/1985 | Harter et al. |
| 4,580,950 | A | 4/1986 | Sumikawa et al. |

(Continued)

FOREIGN PATENT DOCUMENTS

| | | |
|---|---|---|
| EP | 0965192 | 12/1999 |
| EP | 1193969 | 4/2002 |

(Continued)

OTHER PUBLICATIONS

"Using SI Tables to Create Electronic Program Guide," Hewlett Packard.

(Continued)

*Primary Examiner* — Nasser Goodarzi
*Assistant Examiner* — Fred Peng
(74) *Attorney, Agent, or Firm* — FSP LLC

(57) ABSTRACT

A method of generating television Audience Measurement System (AMS) reports and a system executing the method are disclosed. The method comprises the steps of receiving a plurality of encoded report payloads from a plurality of client devices, storing the encoded report payloads in a database, transferring at least one encoded report payload from the database into randomly addressable memory (RAM), decoding the at least one encoded report payload in RAM, parsing the decoded data in RAM with at least one matching algorithm to determine the occurrence of events, compiling a database of parsed data, and generating an AMS report from the database of parsed data.

23 Claims, 3 Drawing Sheets

(56) References Cited

U.S. PATENT DOCUMENTS

| | | |
|---|---|---|
| 4,706,121 A | 11/1987 | Young |
| 4,745,549 A | 5/1988 | Hashimoto |
| 4,751,578 A | 6/1988 | Reiter et al. |
| 4,873,073 A | 10/1989 | Matsui et al. |
| 4,977,455 A | 12/1990 | Young |
| 4,982,343 A | 1/1991 | Hourvitz et al. |
| 4,996,642 A | 2/1991 | Hey |
| 5,047,867 A | 9/1991 | Strubbe et al. |
| 5,151,789 A | 9/1992 | Young |
| 5,161,109 A | 11/1992 | Keating et al. |
| 5,179,439 A | 1/1993 | Hashimoto |
| 5,223,924 A | 6/1993 | Strubbe |
| 5,253,275 A | 10/1993 | Yurt et al. |
| 5,307,173 A | 4/1994 | Yuen et al. |
| 5,323,240 A | 6/1994 | Amano et al. |
| 5,343,665 A | 9/1994 | Palmersten |
| 5,347,632 A | 9/1994 | Filepp et al. |
| 5,351,075 A | 9/1994 | Herz et al. |
| 5,353,121 A | 10/1994 | Young et al. |
| 5,381,523 A | 1/1995 | Hayashi |
| 5,382,779 A | 1/1995 | Gupta |
| 5,410,344 A | 4/1995 | Graves et al. |
| 5,459,826 A | 10/1995 | Archibald |
| 5,483,278 A | 1/1996 | Strubbe et al. |
| 5,534,911 A | 7/1996 | Levitan |
| 5,535,320 A | 7/1996 | Gay et al. |
| 5,541,638 A | 7/1996 | Story |
| 5,541,738 A | 7/1996 | Mankovitz |
| 5,541,991 A | 7/1996 | Benson et al. |
| 5,546,193 A | 8/1996 | Hailey et al. |
| 5,548,708 A * | 8/1996 | Sakashita et al. .......... 345/501 |
| 5,555,496 A | 9/1996 | Tackbary et al. |
| 5,559,549 A | 9/1996 | Hendricks et al. |
| 5,596,373 A | 1/1997 | White et al. |
| 5,600,364 A | 2/1997 | Hendricks et al. |
| 5,608,534 A | 3/1997 | Park et al. |
| 5,635,989 A | 6/1997 | Rothmuller |
| 5,647,181 A | 7/1997 | Hunts |
| 5,649,186 A | 7/1997 | Ferguson |
| 5,649,216 A | 7/1997 | Sieber |
| 5,657,414 A | 8/1997 | Lett et al. |
| 5,680,619 A | 10/1997 | Gudmundson et al. |
| 5,684,525 A | 11/1997 | Klosterman |
| 5,740,425 A | 4/1998 | Povilus |
| 5,748,257 A | 5/1998 | Kawabata et al. |
| 5,748,484 A | 5/1998 | Cannon et al. |
| 5,749,083 A | 5/1998 | Koda et al. |
| 5,761,372 A | 6/1998 | Yoshinobu et al. |
| 5,801,747 A | 9/1998 | Bedard |
| 5,822,014 A | 10/1998 | Steyer et al. |
| 5,822,123 A | 10/1998 | Davis et al. |
| 5,844,620 A | 12/1998 | Coleman et al. |
| 5,860,073 A | 1/1999 | Ferrel et al. |
| 5,861,906 A | 1/1999 | Dunn et al. |
| 5,870,718 A | 2/1999 | Spector |
| 5,873,073 A | 2/1999 | Bresnan et al. |
| 5,890,175 A | 3/1999 | Wong et al. |
| 5,907,704 A | 5/1999 | Gudmundson et al. |
| 5,926,825 A | 7/1999 | Shirakawa |
| 5,930,810 A | 7/1999 | Farros et al. |
| 5,933,811 A | 8/1999 | Angles et al. |
| 5,948,061 A | 9/1999 | Merriman et al. |
| 5,956,736 A | 9/1999 | Hanson et al. |
| 5,963,968 A | 10/1999 | Warmus et al. |
| 5,973,683 A | 10/1999 | Cragun et al. |
| 5,974,396 A | 10/1999 | Anderson et al. |
| 5,983,227 A | 11/1999 | Nazem et al. |
| 5,983,243 A | 11/1999 | Heiney et al. |
| 5,986,670 A | 11/1999 | Dries et al. |
| 5,987,454 A | 11/1999 | Hobbs |
| 5,999,912 A | 12/1999 | Wodarz et al. |
| 6,005,560 A | 12/1999 | Gill et al. |
| 6,005,597 A | 12/1999 | Barrett et al. |
| 6,009,410 A | 12/1999 | LeMole et al. |
| 6,026,417 A | 2/2000 | Ross et al. |
| 6,034,678 A | 3/2000 | Hoarty et al. |
| 6,035,584 A | 3/2000 | Barreto |
| 6,052,514 A | 4/2000 | Gill et al. |
| 6,064,967 A | 5/2000 | Speicher |
| 6,072,983 A | 6/2000 | Klosterman |
| 6,081,262 A | 6/2000 | Gill et al. |
| 6,085,485 A | 7/2000 | Murdock |
| 6,088,722 A | 7/2000 | Herz et al. |
| 6,094,186 A | 7/2000 | Kuroda et al. |
| 6,097,878 A | 8/2000 | Saib |
| 6,108,673 A | 8/2000 | Brandt et al. |
| 6,118,449 A | 9/2000 | Rosen et al. |
| 6,118,925 A | 9/2000 | Murata et al. |
| 6,119,101 A | 9/2000 | Peckover |
| 6,144,944 A | 11/2000 | Kurtzman, II et al. |
| 6,157,411 A | 12/2000 | Williams et al. |
| 6,167,382 A | 12/2000 | Sparks et al. |
| 6,182,050 B1 | 1/2001 | Ballard |
| 6,192,382 B1 | 2/2001 | Lafer et al. |
| 6,205,582 B1 | 3/2001 | Hoarty |
| 6,216,112 B1 | 4/2001 | Fuller et al. |
| 6,230,143 B1 | 5/2001 | Simons et al. |
| 6,243,375 B1 | 6/2001 | Speicher |
| 6,247,047 B1 | 6/2001 | Wolff |
| 6,253,238 B1 | 6/2001 | Lauder et al. |
| 6,271,860 B1 | 8/2001 | Gross |
| 6,286,005 B1 | 9/2001 | Cannon |
| 6,311,211 B1 | 10/2001 | Shaw et al. |
| 6,312,336 B1 | 11/2001 | Handelman et al. |
| 6,313,822 B1 | 11/2001 | McKay et al. |
| 6,317,883 B2 | 11/2001 | Marics |
| 6,334,109 B1 | 12/2001 | Kanevsky et al. |
| 6,356,903 B1 | 3/2002 | Baxter et al. |
| 6,385,592 B1 | 5/2002 | Angles et al. |
| 6,400,406 B1 | 6/2002 | Kim |
| 6,401,075 B1 | 6/2002 | Mason et al. |
| 6,405,371 B1 | 6/2002 | Oosterhout et al. |
| 6,415,316 B1 | 7/2002 | Van Der Meer |
| 6,425,128 B1 | 7/2002 | Krapf et al. |
| 6,438,752 B1 | 8/2002 | McClard |
| 6,446,045 B1 | 9/2002 | Stone et al. |
| 6,449,657 B2 | 9/2002 | Stanbach, Jr. et al. |
| 6,462,754 B1 | 10/2002 | Chakraborty et al. |
| 6,463,585 B1 | 10/2002 | Hendricks et al. |
| 6,473,794 B1 | 10/2002 | Guheen et al. |
| 6,477,705 B1 | 11/2002 | Yuen et al. |
| 6,484,148 B1 | 11/2002 | Boyd |
| 6,484,149 B1 | 11/2002 | Jammes et al. |
| 6,493,688 B1 | 12/2002 | Das et al. |
| 6,496,857 B1 | 12/2002 | Dustin et al. |
| 6,513,035 B1 | 1/2003 | Tanaka et al. |
| 6,519,571 B1 | 2/2003 | Guheen et al. |
| 6,526,577 B1 | 2/2003 | Knudson et al. |
| 6,538,701 B1 | 3/2003 | Yuen |
| 6,553,178 B2 | 4/2003 | Abecassis |
| 6,567,854 B1 | 5/2003 | Olshansky et al. |
| 6,571,053 B1 | 5/2003 | Yasuzato |
| 6,587,835 B1 | 7/2003 | Treyz et al. |
| 6,589,292 B1 | 7/2003 | Langford-Wilson |
| 6,601,107 B1 | 7/2003 | Seibert |
| 6,604,088 B1 | 8/2003 | Landom et al. |
| 6,604,328 B1 | 8/2003 | Paddock |
| 6,611,348 B1 | 8/2003 | Chase et al. |
| 6,611,349 B1 | 8/2003 | Vogt et al. |
| 6,611,958 B1 | 8/2003 | Shintani et al. |
| 6,618,504 B1 | 9/2003 | Yoshino |
| 6,628,314 B1 | 9/2003 | Hoyle |
| 6,637,029 B1 | 10/2003 | Maissel et al. |
| 6,684,369 B1 | 1/2004 | Bernardo et al. |
| 6,691,093 B2 | 2/2004 | Shell |
| 6,701,060 B2 | 3/2004 | Yuen et al. |
| 6,704,931 B1 | 3/2004 | Schaffer et al. |
| 6,718,551 B1 | 4/2004 | Swix et al. |
| 6,728,966 B1 | 4/2004 | Arsenault et al. |
| 6,738,978 B1 | 5/2004 | Hendricks et al. |
| 6,748,397 B2 | 6/2004 | Choi |
| 6,763,334 B1 | 7/2004 | Matsumoto et al. |
| 6,795,972 B2 | 9/2004 | Rovira |
| 6,799,327 B1 | 9/2004 | Reynolds et al. |

(56) References Cited

U.S. PATENT DOCUMENTS

| | | | |
|---|---|---|---|
| 6,801,917 B2 | 10/2004 | Gutta et al. | |
| 6,810,526 B1 | 10/2004 | Menard et al. | |
| 6,813,776 B2 | 11/2004 | Chernock et al. | |
| 6,829,587 B2 | 12/2004 | Stone et al. | |
| 6,829,780 B2 | 12/2004 | Kraft et al. | |
| 6,847,969 B1 | 1/2005 | Mathai et al. | |
| 6,851,090 B1 | 2/2005 | Gutta et al. | |
| 6,889,385 B1 | 5/2005 | Rakib et al. | |
| 6,918,132 B2 | 7/2005 | Gargi | |
| 6,922,844 B1 | 7/2005 | Arsenault et al. | |
| 6,954,728 B1 | 10/2005 | Kusumoto et al. | |
| 6,958,759 B2 | 10/2005 | Safadi et al. | |
| 6,973,665 B2 | 12/2005 | Dudkiewicz et al. | |
| 6,983,478 B1* | 1/2006 | Grauch et al. | 725/13 |
| 7,010,497 B1 | 3/2006 | Nyhan et al. | |
| 7,020,652 B2 | 3/2006 | Matz et al. | |
| 7,051,352 B1 | 5/2006 | Schaffer | |
| 7,055,165 B2 | 5/2006 | Connelly | |
| 7,069,228 B1 | 6/2006 | Rose et al. | |
| 7,109,985 B2 | 9/2006 | Spencer et al. | |
| 7,120,591 B1 | 10/2006 | Solomon et al. | |
| 7,131,134 B2 | 10/2006 | Trovato et al. | |
| 7,143,066 B2 | 11/2006 | Shear et al. | |
| 7,143,160 B2 | 11/2006 | Tamaki | |
| 7,146,626 B1 | 12/2006 | Arsenault et al. | |
| 7,152,237 B2 | 12/2006 | Flickinger et al. | |
| 7,159,175 B2 | 1/2007 | Ishii et al. | |
| 7,165,041 B1 | 1/2007 | Guheen et al. | |
| 7,171,677 B1 | 1/2007 | Ochiai | |
| 7,181,445 B2 | 2/2007 | Bebo et al. | |
| 7,188,355 B1 | 3/2007 | Prokopenko et al. | |
| 7,188,356 B1 | 3/2007 | Miura et al. | |
| 7,200,853 B2 | 4/2007 | Kawai | |
| 7,204,025 B2 | 4/2007 | Ziegs et al. | |
| 7,213,027 B1 | 5/2007 | Kominek et al. | |
| 7,231,607 B2 | 6/2007 | Neely et al. | |
| 7,239,779 B2 | 7/2007 | Little | |
| 7,240,025 B2 | 7/2007 | Stone et al. | |
| 7,249,059 B2 | 7/2007 | Dean et al. | |
| 7,254,829 B1 | 8/2007 | Brown et al. | |
| 7,263,270 B2 | 8/2007 | Lapstun et al. | |
| 7,263,709 B1 | 8/2007 | Krapf | |
| 7,266,733 B2 | 9/2007 | Bazinet et al. | |
| 7,284,064 B1 | 10/2007 | Connelly | |
| 7,292,723 B2 | 11/2007 | Tedesco et al. | |
| 7,304,685 B2 | 12/2007 | Park et al. | |
| 7,312,772 B2 | 12/2007 | Kim | |
| 7,315,983 B2 | 1/2008 | Evans et al. | |
| 7,319,976 B1 | 1/2008 | Peckover | |
| 7,340,457 B1 | 3/2008 | Killian et al. | |
| 7,343,157 B1 | 3/2008 | Mitchell | |
| 7,343,354 B2 | 3/2008 | Hennessey | |
| 7,398,541 B2 | 7/2008 | Bennington et al. | |
| 7,421,467 B2 | 9/2008 | Kaneko et al. | |
| 7,421,724 B2 | 9/2008 | Klosterman et al. | |
| 7,428,555 B2 | 9/2008 | Yan | |
| 7,434,160 B2 | 10/2008 | Peiro et al. | |
| 7,440,674 B2 | 10/2008 | Plotnick et al. | |
| 7,441,260 B2 | 10/2008 | Kurapati | |
| 7,444,658 B1 | 10/2008 | Matz et al. | |
| 7,464,344 B1 | 12/2008 | Carmichael et al. | |
| 7,469,943 B2 | 12/2008 | Hiramoto | |
| 7,480,701 B2 | 1/2009 | Smith et al. | |
| 7,487,529 B1 | 2/2009 | Orlick | |
| 7,493,641 B2 | 2/2009 | Klosterman et al. | |
| 7,496,943 B1 | 2/2009 | Goldberg et al. | |
| 7,499,628 B2 | 3/2009 | Yuen et al. | |
| 7,500,202 B2 | 3/2009 | Gerba et al. | |
| 7,503,058 B2 | 3/2009 | Van Horck | |
| 7,508,942 B2 | 3/2009 | Candelore | |
| 7,509,580 B2 | 3/2009 | Sezan et al. | |
| 7,533,034 B2 | 5/2009 | Laurin et al. | |
| 7,542,657 B2 | 6/2009 | Yuen et al. | |
| 7,552,458 B1 | 6/2009 | Finseth et al. | |
| 7,564,369 B1 | 7/2009 | Adams et al. | |
| 7,631,329 B1 | 12/2009 | Yamada | |
| 7,644,425 B2 | 1/2010 | Parker et al. | |
| 7,653,603 B1 | 1/2010 | Holtkamp, Jr. et al. | |
| 7,668,950 B2 | 2/2010 | Horowitz et al. | |
| 7,685,019 B2 | 3/2010 | Collins | |
| 7,698,719 B2 | 4/2010 | Evans et al. | |
| 7,752,073 B2 | 7/2010 | Barry et al. | |
| 7,757,252 B1 | 7/2010 | Agasse | |
| 7,774,341 B2 | 8/2010 | Aravamudan et al. | |
| 7,797,168 B2 | 9/2010 | Kusumoto et al. | |
| 7,814,421 B2 | 10/2010 | Reynolds et al. | |
| 7,827,062 B2 | 11/2010 | Merriman et al. | |
| 7,840,437 B2 | 11/2010 | Lewis | |
| 7,844,985 B2 | 11/2010 | Hendricks et al. | |
| 7,853,969 B2 | 12/2010 | Smith et al. | |
| 7,873,972 B2 | 1/2011 | Zaslavsky et al. | |
| 7,890,490 B1 | 2/2011 | Bovenschulte et al. | |
| 7,904,814 B2 | 3/2011 | Errico et al. | |
| 7,904,922 B1 | 3/2011 | Haberman et al. | |
| 7,930,207 B2 | 4/2011 | Merriman et al. | |
| 7,937,725 B1 | 5/2011 | Schaffer et al. | |
| 7,970,648 B2 | 6/2011 | Gailey et al. | |
| 7,992,068 B2 | 8/2011 | Chen et al. | |
| 7,996,864 B2 | 8/2011 | Yuen et al. | |
| 8,001,487 B2 | 8/2011 | Koppert | |
| 8,032,414 B2 | 10/2011 | Payne et al. | |
| 8,032,835 B1 | 10/2011 | Clevenger et al. | |
| 8,032,853 B2 | 10/2011 | Awashima | |
| 8,056,099 B2 | 11/2011 | Shanks et al. | |
| 8,091,031 B2 | 1/2012 | Evans | |
| 8,341,550 B2 | 12/2012 | De Heer et al. | |
| 8,359,616 B2 | 1/2013 | Rosenberg et al. | |
| 2001/0034654 A1 | 10/2001 | Vigil et al. | |
| 2002/0010926 A1 | 1/2002 | Lee | |
| 2002/0036654 A1 | 3/2002 | Evans et al. | |
| 2002/0042921 A1 | 4/2002 | Ellis | |
| 2002/0049975 A1 | 4/2002 | Thomas et al. | |
| 2002/0059094 A1 | 5/2002 | Hosea et al. | |
| 2002/0059621 A1 | 5/2002 | Thomas et al. | |
| 2002/0067376 A1 | 6/2002 | Martin et al. | |
| 2002/0087986 A1 | 7/2002 | Markel | |
| 2002/0178446 A1 | 11/2002 | Sie et al. | |
| 2002/0194591 A1 | 12/2002 | Gargi | |
| 2003/0051238 A1 | 3/2003 | Barone, Jr. | |
| 2003/0084441 A1 | 5/2003 | Hunt | |
| 2003/0084446 A1 | 5/2003 | Thurston et al. | |
| 2003/0097657 A1 | 5/2003 | Zhou et al. | |
| 2003/0103088 A1 | 6/2003 | Dresti et al. | |
| 2003/0115597 A1 | 6/2003 | Yassin et al. | |
| 2003/0131355 A1 | 7/2003 | Berenson et al. | |
| 2003/0135464 A1 | 7/2003 | Mourad et al. | |
| 2003/0145323 A1 | 7/2003 | Hendricks et al. | |
| 2003/0171991 A1 | 9/2003 | Robbins | |
| 2003/0204846 A1 | 10/2003 | Breen et al. | |
| 2003/0204854 A1 | 10/2003 | Blackketter et al. | |
| 2004/0039648 A1 | 2/2004 | Candelore et al. | |
| 2004/0070593 A1 | 4/2004 | Neely et al. | |
| 2004/0078809 A1 | 4/2004 | Drazin | |
| 2004/0184548 A1 | 9/2004 | Kerbiriou et al. | |
| 2004/0194128 A1 | 9/2004 | McIntyre et al. | |
| 2004/0255336 A1 | 12/2004 | Logan et al. | |
| 2004/0261112 A1 | 12/2004 | Hicks, III et al. | |
| 2004/0268413 A1 | 12/2004 | Reid et al. | |
| 2005/0010531 A1 | 1/2005 | Kushalnagar et al. | |
| 2005/0018079 A1 | 1/2005 | Van Der Vleuten | |
| 2005/0021761 A1 | 1/2005 | Thomas | |
| 2005/0063677 A1 | 3/2005 | Kosako et al. | |
| 2005/0155067 A1 | 7/2005 | McKenna | |
| 2005/0160468 A1 | 7/2005 | Rodriguez | |
| 2005/0172314 A1 | 8/2005 | Krakora et al. | |
| 2005/0203943 A1 | 9/2005 | Su et al. | |
| 2005/0235318 A1* | 10/2005 | Grauch et al. | 725/46 |
| 2006/0015911 A1 | 1/2006 | Dean | |
| 2006/0039481 A1 | 2/2006 | Shen et al. | |
| 2006/0059277 A1 | 3/2006 | Zito et al. | |
| 2006/0085828 A1 | 4/2006 | Dureau et al. | |
| 2006/0101338 A1 | 5/2006 | Kates | |
| 2006/0125962 A1 | 6/2006 | Shelton et al. | |
| 2006/0218583 A1 | 9/2006 | Vanparijs et al. | |

(56) References Cited

U.S. PATENT DOCUMENTS

| | | |
|---|---|---|
| 2006/0230417 A1 | 10/2006 | Van Horck |
| 2006/0282852 A1 | 12/2006 | Purpura et al. |
| 2007/0011702 A1 | 1/2007 | Vaysman |
| 2007/0016925 A1 | 1/2007 | Vaysman et al. |
| 2007/0022032 A1* | 1/2007 | Anderson et al. ............... 705/35 |
| 2007/0039018 A1* | 2/2007 | Saslow et al. ................... 725/22 |
| 2007/0044127 A1 | 2/2007 | Vaysman et al. |
| 2007/0070218 A1 | 3/2007 | Meijer et al. |
| 2007/0113257 A1 | 5/2007 | Takemoto |
| 2007/0144090 A1 | 6/2007 | Nguyen |
| 2007/0157248 A1 | 7/2007 | Ellis |
| 2007/0174286 A1 | 7/2007 | Seitz et al. |
| 2007/0204302 A1 | 8/2007 | Calzone |
| 2007/0214470 A1* | 9/2007 | Glasgow et al. ................ 725/10 |
| 2007/0214478 A1 | 9/2007 | Feldstein et al. |
| 2007/0234388 A1 | 10/2007 | King |
| 2008/0002580 A1 | 1/2008 | Kawada et al. |
| 2008/0059312 A1 | 3/2008 | Gern et al. |
| 2008/0092182 A1 | 4/2008 | Conant |
| 2008/0154803 A1* | 6/2008 | Stein et al. ........................ 706/1 |
| 2008/0183577 A1 | 7/2008 | Evans |
| 2008/0196071 A1 | 8/2008 | Manthoulis |
| 2008/0275786 A1 | 11/2008 | Gluck |
| 2008/0282290 A1 | 11/2008 | Malik et al. |
| 2009/0055268 A1 | 2/2009 | Knoller et al. |
| 2009/0158337 A1 | 6/2009 | Stiers et al. |
| 2009/0259957 A1 | 10/2009 | Slocum et al. |
| 2009/0287610 A1 | 11/2009 | Bradshaw et al. |
| 2010/0017820 A1 | 1/2010 | Thevathasan et al. |
| 2010/0153983 A1 | 6/2010 | Philmon et al. |
| 2010/0205562 A1 | 8/2010 | de Heer |
| 2010/0324997 A1 | 12/2010 | Evans |
| 2011/0110515 A1 | 5/2011 | Tidwell et al. |
| 2011/0125586 A1 | 5/2011 | Evans |
| 2011/0138327 A1 | 6/2011 | Scott et al. |
| 2011/0202960 A1 | 8/2011 | Vaysman et al. |
| 2011/0209173 A1 | 8/2011 | Vaysman et al. |
| 2011/0209179 A1 | 8/2011 | Vaysman et al. |
| 2011/0225591 A1 | 9/2011 | Wada et al. |
| 2011/0225612 A1 | 9/2011 | Vaysman et al. |
| 2011/0265120 A1 | 10/2011 | Vaysman et al. |
| 2011/0296467 A1 | 12/2011 | Vaysman et al. |
| 2011/0307925 A1 | 12/2011 | Vaysman et al. |
| 2011/0314501 A1 | 12/2011 | Vaysman et al. |
| 2012/0011544 A1 | 1/2012 | Vaysman et al. |
| 2012/0072952 A1 | 3/2012 | Vaysman et al. |
| 2012/0254910 A1 | 10/2012 | Donoghue et al. |

FOREIGN PATENT DOCUMENTS

| | | |
|---|---|---|
| EP | 1193976 | 4/2002 |
| EP | 1280343 | 1/2003 |
| EP | 1423794 | 6/2004 |
| FR | 2836321 | 8/2003 |
| GB | 2375674 | 11/2002 |
| WO | WO0237840 | 5/2002 |
| WO | WO0245304 | 6/2002 |
| WO | WO02102079 | 12/2002 |
| WO | WO03054678 | 7/2003 |
| WO | WO2005107245 | 11/2005 |
| WO | WO2006018825 | 2/2006 |
| WO | WO2006055243 | 5/2006 |

OTHER PUBLICATIONS

PCT Patentability Report for PCT/US2006/003420, dated Apr. 3, 2008.
PCT Search Report for PCT/US2006/003420, dated Apr. 3, 2008.
PCT Search Report for PCT/US2012/38328, dated Aug. 9, 2012.
PCT Search Report for PCT/US2012/39280, dated Aug. 13, 2012.
PCT Search Report for PCT/US2012/39683, dated Aug. 10, 2012.
PCT Search and Patentability Report for PCT/US2014/057375, dated Dec. 24, 2014.
EP Search Report for PCT/US2012040683, dated Aug. 27, 2014.
PCT Search Report for PCT/US2013/053894, dated Feb. 10, 2015.
PCT Patentability Report for PCT/US12/40683, dated Aug. 9, 2012.
PCT Patentability Report for PCT/US12/41154, dated Aug. 14, 2013.
PCT Search and Patentability Report for PCT/US2012/032323, dated Jun. 19, 2012.

* cited by examiner

SYSTEM AND METHOD TO INCREASE EFFICIENCY AND SPEED OF ANALYTICS REPORT GENERATION IN AUDIENCE MEASUREMENT SYSTEMS

REFERENCE TO RELATED APPLICATIONS

This application claims priority to U.S. provisional Application Ser. No. 61/489,422, filed May 24, 2011, entitled "System and Method for Audience Measurement System Increase in Efficiency and Speed of Analytics Report Generation," which is hereby specifically and entirely incorporated by reference.

BACKGROUND

1. Field of the Invention

The invention is directed to television advertisements. Specifically, the invention is directed to reporting viewership of television advertisements and programs.

2. Background of the Invention

Audience Measurement Systems (AMS) should record all events generated by a consumer device, sends them to a centralized location, and allows interested parties to generate reports on all viewed content units, including channel, program, advertisements, etc. Audience Behavior Measurement Systems (BMS) should allow for the recording and monitoring of an audience's interaction with virtually any device or system, including household appliances, radio, TV, gaming consoles, smart phones, tablets, PCs, and so forth.

Due to the amount of data that needs to be collected, transported, stored, retrieved, and processed, the capabilities of existing cost-effective systems can be easily exceeded if the systems are used to generate reports on each and every content unit (program, ad, interactive TV applications, video-on-demand content, etc.) with no margin of error while allowing the user to look back and generate any type of report based on historical data. For example, the PayTV industry in the U.S.A has 60 million digital TV subscribers, where each subscriber generates, on average, approximately one hundred events per day. An Audience Measurement System with such capabilities would need to generate, transport, and store approximately 6 billion events to generate a report on every subscriber. To generate a program or ad rating report, such a system, for each report, will have to process 6 billion records per day of data. Moreover, considering that a typical linear channel lineup in the U.S.A is approximately 300 channels, and each hour of a broadcasted programming has up to 22 minutes allocated for ad spots (which are typically 30 seconds or less), there are up to 316,800 ad units per day which need to be mapped to about 1,000 socioeconomic, demographic, purchasing, housing, and other profiles. Such an amount of data currently makes creation of such systems impractical.

To date, no AMS have been created for the PayTV industry with the abovementioned capabilities, within a reasonable budget, because they have not overcome the limitations caused by the set-top-box return path (i.e. the set-top-box's upstream bandwidth to the head-end), the speed of data retrieval from centralized storage, the cost of CPU data processing to generate the necessary reports, and the time necessary to complete the requested reports (with 316,800 ad units, six billion US records per user per day, and 0.01 millisecond per one comparison, report generation can take up to 602 years to process on a modern computer).

Existing systems (for example, the one described in U.S. Pat. No. 6,983,478 entitled Method and System For Tracking Network Use) propose to create event timelines for each panel participant in a Parse and Merge Data engine by decoding and parsing data received from each panel participant's set-top-box, merging event records data with programming and ad data, and forming even timeline records for each of panel participant's set-top-boxes Such a design and listed operations present two problems. The first challenge is that the systems require substantial amount of processing power to perform parsing, and a substantial amount of I/O (read and write) operations to create and store timeline records. This requirement dramatically limits the ability to cost-effectively scale, to provide support panels with reasonable number of panel participants, and to accurately represent viewing patterns of a requested targeting profile.

A second problem associated with the abovementioned approach creates timeline data records which are very large by their nature. Considering that the final product of this process is analytics report(s), and to generate such report analytics system has to run database queries over very large number of records, and each report generation consumes a substantial amount of time and computing resources.

SUMMARY OF THE INVENTION

The present invention overcomes the problems and disadvantages associated with current strategies and designs and provides new tools and methods of measuring viewership of many types of content.

One embodiment of the invention is directed to a method of generating television analytics Audience Measurement System (AMS) reports. The method comprises the steps of, on a processor, receiving a plurality of encoded report payloads from a plurality of client devices, storing the encoded report payloads in a database, transferring at least one encoded report payload from the database into randomly addressable memory (RAM), decoding the at least one encoded report payload in RAM, parsing the decoded data in RAM with at least one matching algorithm to determine the occurrence of events, compiling a database of parsed data, and generating an AMS report from the database of parsed data.

Preferably, the steps of decoding the at least one encoded report payload in the RAM and parsing the decoded data in RAM with at least one analytics matching algorithm to determine the occurrence of events are repeated for each encoded report payload. In the preferred embodiment, the decoded report payload is not saved. Preferably, the step of compiling a database of parsed data comprises storing the parsed data in one of an intermediate panel report database or a final panel report database.

An event preferably is at least one of an advertisement was displayed, a TV broadcast was displayed, a button was pressed on a remote control, a biometric recording of a viewer was obtained, or an activation of an interactive element of an advertisement. Preferably, each encoded report payload comprises a client device identifier and a plurality of encoded AMS events. In the preferred embodiment, the step of parsing the decoded data with at least one matching algorithm to determine the occurrence of events is completed via a bitmask algorithm.

The method of claim 1, wherein one encoded report payload is parsed before a second encoded report payload is parsed.

Preferably, each set of decoded data is parsed for at least one specific event determined by a panel definition. The report preferably comprises a count of the number of times a specific event occurred. In the preferred embodiment, each client device is one of a set top box, a TV, a computer, a tablet, a smartphone, or a streaming media device.

Another embodiment of the invention is directed to a system for generating analytics television Audience Measurement System (AMS) reports. The system comprises a processor, randomly accessible memory (RAM) in communication with the processor, an encoded reports payloads database in communication with the processor, a parsed data database in communication with the processor, a transceiver in communication with the processor, and software executing on the processor. The software receives a plurality of encoded report payloads from a plurality of client devices, stores the plurality of encoded report payloads in the encoded reports payloads database, transfers at least one encoded report payload from the encoded reports payloads database into RAM, decodes each encoded report payload in RAM, parses the decoded data in RAM with at least one matching algorithm to determine the occurrence of events, compiles a record of parsed data for storage in the parsed data database, and generates an AMS report from the data stored in the parsed data database.

Preferably the software repeats the steps of decoding the at least one encoded report payload in RAM and parsing the decoded data in the RAM with at least one analytics matching algorithm to determine the occurrence of events for each encoded report payload. In the preferred embodiment, the decoded report payload is not saved. The database of parsed data preferably comprises an intermediate panel report database and a final panel report database.

Preferably, an event is at least one of an advertisement was displayed, a TV broadcast was displayed, a button was pressed on a remote control, a biometric recording of a viewer was obtained, or an activation of an interactive element of an advertisement. Each encoded report payload preferably comprises a client device identifier and a plurality of encoded AMS events.

Preferably the software uses a bitmask algorithm as the matching algorithm. In the preferred embodiment, one encoded report payload is parsed before a second encoded report payload is parsed. Preferably, each encoded report payload does not store timestamp records. Each set of decoded data is preferably parsed for at least one specific event determined by a panel definition. Preferably, the report comprises a count of the number of times a specific event occurred. Preferably, each client device is one of a set top box, a TV, a computer, a tablet, a smartphone, or a streaming media device.

Other embodiments and advantages of the invention are set forth in part in the description, which follows, and in part, may be obvious from this description, or may be learned from the practice of the invention.

DESCRIPTION OF THE DRAWING

The invention is described in greater detail by way of example only and with reference to the attached drawing, in which.

DESCRIPTION OF THE INVENTION

Figure 1:
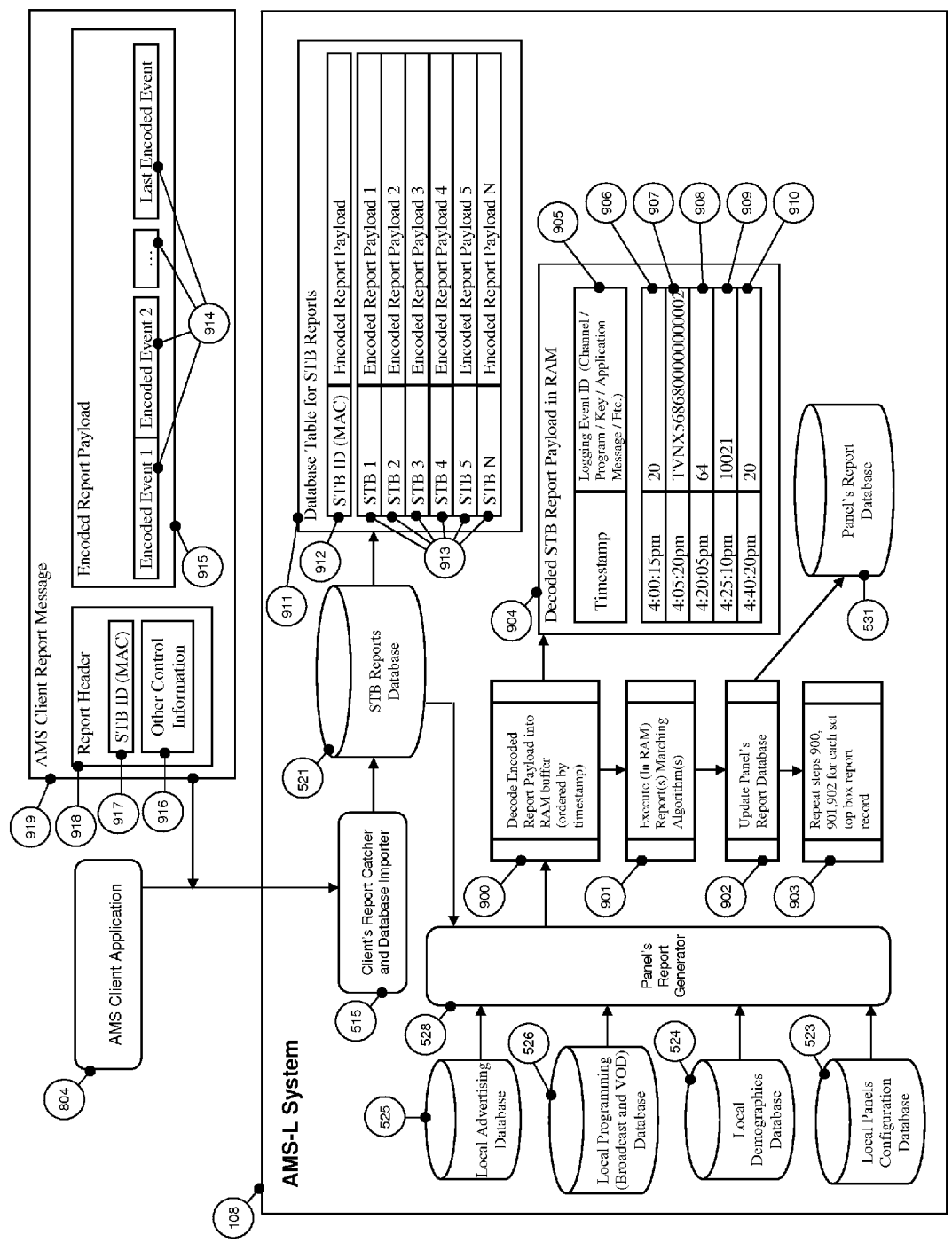
FIG. 1 depicts an embodiment of system dataflow from an AMS-A to the AMS-L subsystem.

As embodied and broadly described herein, the disclosures herein provide detailed embodiments of the invention. However, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention A problem in the art capable of being solved by the embodiments of the present invention is measuring TV viewership. It has been surprisingly discovered that by reducing the processing, storage, and read/write (I/O) requirements of an AMS, cost-effective and fast analytics report generation for a system with a large number of panels and a large number of panel participates can be achieved.

The embodiments of the present invention do not process or record timeline database records. Instead, the client devices store original encoded report payloads. The payloads are preferably decoded into RAM using an analytics reports bitmask algorithm and stored in a Panel's report database.

The AMS collects data and creates cost-effective, census level accuracy reports. In the preferred embodiment the AMS is comprised of several tiers of distributed computing components residing at different typological network points within the content distribution system to enable cost-effective processing of large amount of collected data. Tier 1 is comprised of AMS-A, Tier 2 of AMS-L, Tier 3 AMS-C. AMS-A is an AMS client application which resides in video playback device, e.g TV set, set top box, video streaming adapter. AMS-L is a backend server based sub-system which acts as a first collecting and pre-processing point for the data generated by AMS-A components. After data pre-processing is completed, AMS-L sends data to AMS-C. AMS-C is a backend server based sub-system which acts as a last data processing prior to data being archived and exported to ad agencies. Depending on content distribution network topology and scale, locations and total number of AMS-L components would vary. For example, small content distribution system would only have AMS-A and AMS-L components and utilize AMS-C component located outside of that particular content distribution network.

Each AMS-A (client device level) is preferably responsible for receiving configuration messages from the AMS-L and executing the logging, processing, and report of events in accordance with the received configuration messages. Each AMS-A is preferably a client's set top box, TV, computer, tablet, smartphone, streaming media device, or other media playing device.

Each AMS-L (local node level) is preferably responsible for receiving panel definitions, subscriber profile information, and program and ad schedules from the AMS-C, a TV Traffic System, an Electronic Program Guide Server, and/or a Video-on-Demand server. The AMS-L is also preferably responsible for sending configuration messages to each AMS-A and performing upstream bandwidth optimization. The AMS-L is also preferably responsible for receiving reports from each AMS-A, merging panel reports, and sending requested reports to the AMS-C for further merging. Each AMS-L is preferably maintained by a media service provider such as a cable company, a satellite TV company, a streaming media company, or an internet service provider.

The AMS-C (central level) is preferably responsible for receiving panel definitions from ad agencies, subscriber demographics and socioeconomic metadata from source agencies, programming metadata from national broadcasters, and ad schedules from ad agencies or broadcasters. The AMC-C is preferably responsible for merging requested information and mapping the information into available AMS-L subscriber bases. The AMS-C can receive and merge reports from multiple AMS-Ls. An AMS-C is preferably maintained by a media company such as a broadcaster, a cable TV channel, or an internet web-page.

FIG. 1 depicts an embodiment of system dataflow from an AMS-A 804 to the AMS-L subsystem 108. AMS client application 804 sends AMS Client Report Message 919 to AMS-L subsystem 108, specifically to the AMS-L subsystem's Client's Report Catcher and Database Importer 515. AMS client application 804 receives reporting from AMS-L subsystem 108. Transmission can occur on a regular schedule (e.g. hourly, daily, or weekly), on-demand from the AMS-L subsystem 108, as requested by an advertiser, randomly, after a specific amount of data is recorded (e.g. after a specific number of hours of TV have been watched), or at other intervals.

Each message 919 preferably includes a report header 918 having a client device identifier 917 (e.g. a MAC address) and control information 916 (e.g. report sequence number), and the encoded report payload 915. The encoded report payload 915 includes each AMS event 914.

Events may include who watched a show or commercial, what their reactions were to the show and the commercials, biometric data of the viewers, button presses on the remote control (e.g. if a viewer changed the channel, changed the volume, or fast forwarded through a portion of the content), activation of an interactive element on an advertisement, or other events that can be recorded by the STB.

AMS-L subsystem 108 receives each message 919 via module 515 and stores the STB reports in STB reports database 521. Preferably, STB reports database 521 stores each STB report in the format shown in module 911. The format includes a client device identifier 912 and Encoded Report Payload 915. The reports do not store timestamp records.

Panel reports are generated by module 528. Module 528 retrieves the STB reports from STB reports database 521 and obtains advertising data from local advertising database 525, programming data from local programming database 526, demographics data from local demographics database 524 and panel information from local panels configuration database 523.

Module 528 decodes the encoded report payload in module 900. Module 904 depicts a preferred embodiment of the format of the decoded report payload. The format includes a timestamp associated with an event 905. 906-910 are various possible examples of the decoded events 914.

The decoded data is matched using one or more algorithms to determine what was watched by the viewer in module 901 and the panel report database 531 is updated by module 902. Module 901 can parse the data for specific events (e.g. a specific show that was watched), specific time slots, or other data determined by the panel definition. Module 903 causes AMS-L subsystem 108 to repeat the process for each STB. When the system finishes counting a number of event occurrences, it may add an updated count to the panel report database 531.

Figure 2:
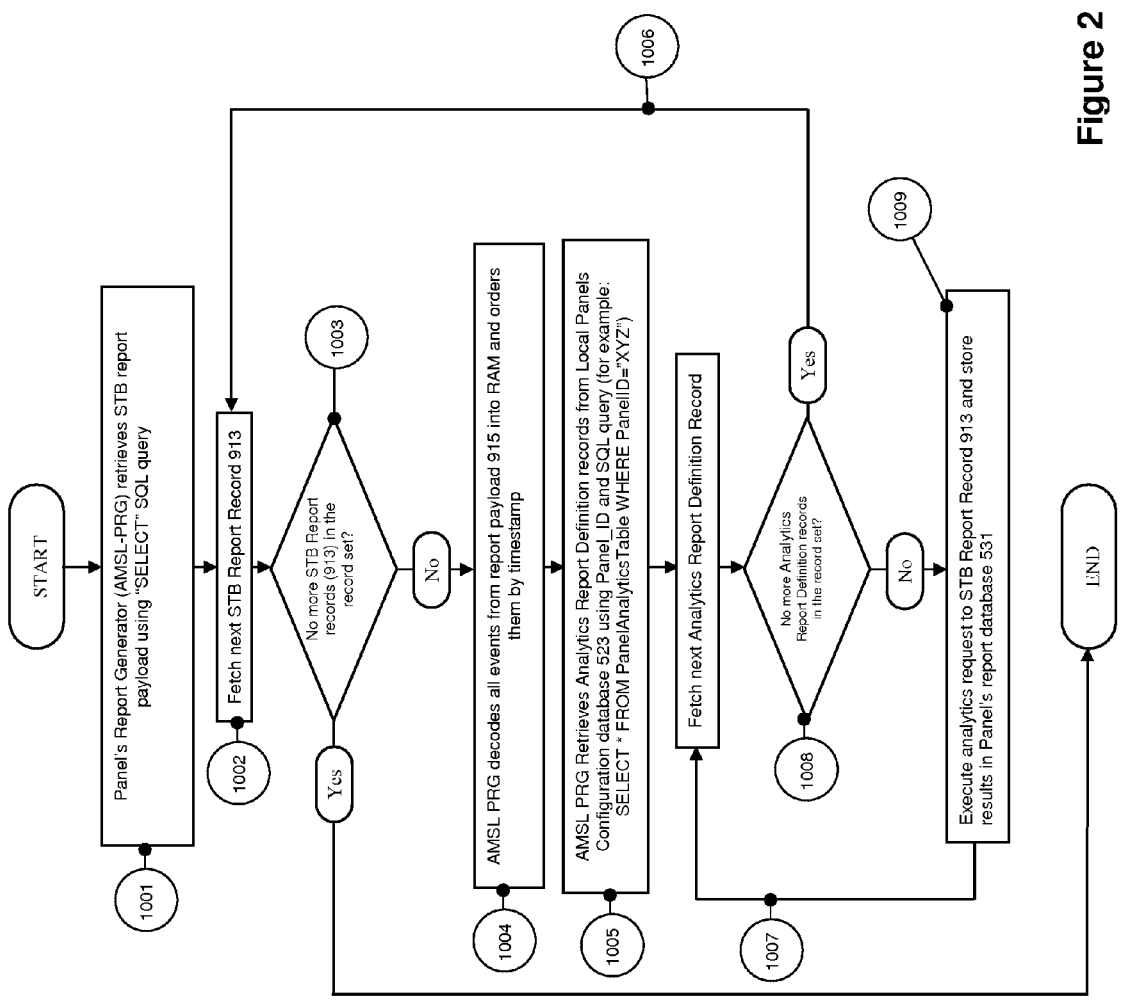
FIG. 2 depicts an embodiment of a method of processing data without bitmask execution.

FIG. 2 depicts an embodiment of a method of data processing without bitmask execution. At step 1001, the panel's report generator retrieves STB reports payload using a "select" SQL (structured query language) query. The next STB report record is obtained at step 1002. At step 1003 the system determines if there are additional STB report records, if there are, the method continues, if not, the method ends. At step 1004, the AMS-L subsystem decodes all events from the STB report payload into RAM and orders the events by timestamp. At step 1005, the AMS-L subsystem retrieves analytics report definitions from the local panel configuration database using a panel ID number and SQL query (e.g. SELECT * FROM PanelAnalyticsTable WHERE PanelID="xyz"). The system then parses each event at step 1008, executes analytics request to the STB report and stores the results in the panel's report database at step 1009. At step 1006 once all the events in a first STB report record are exhausted, a new STB report record is parsed until no more STB report records remain.

Figure 3:
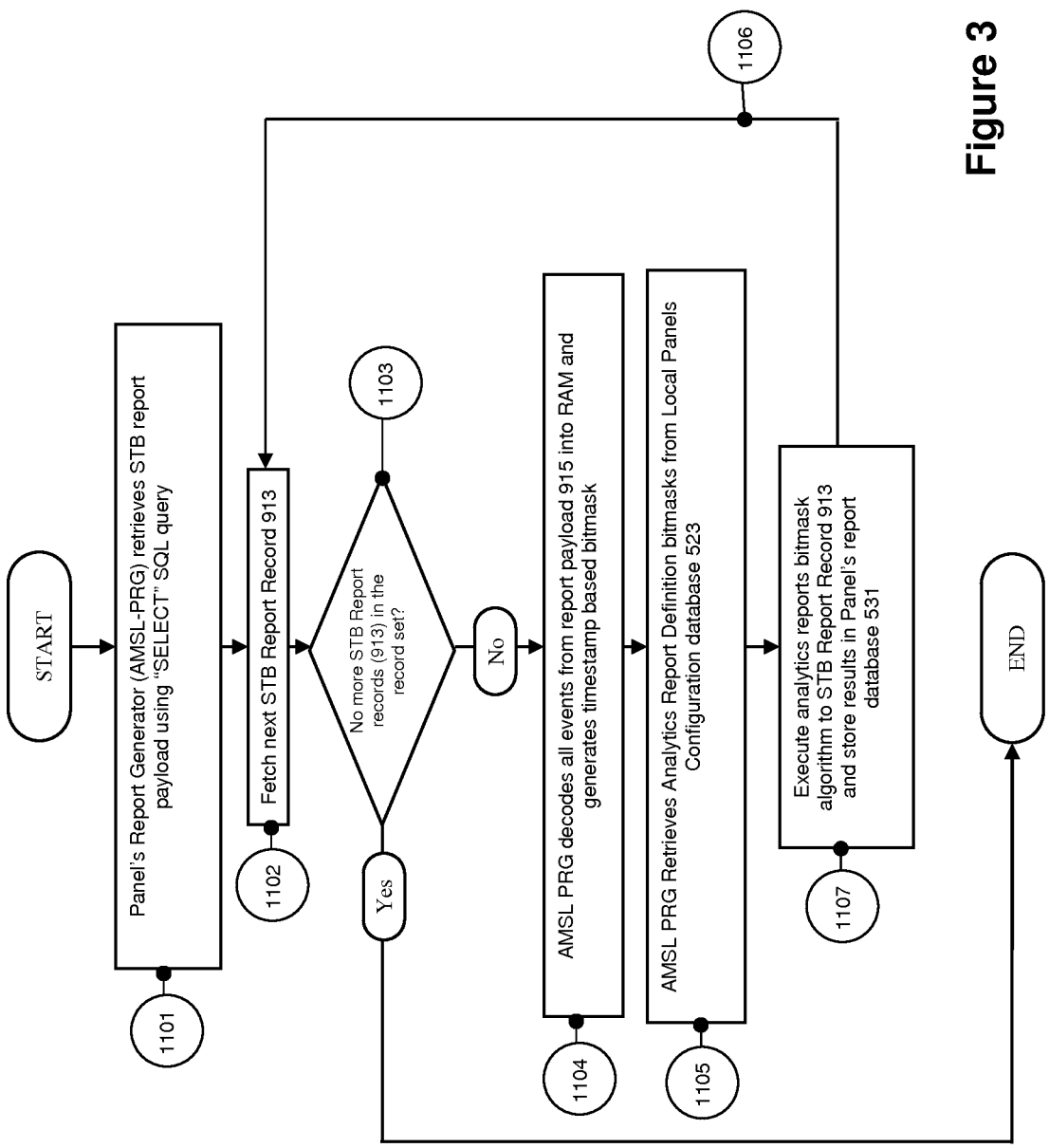
FIG. 3 depicts an embodiment of a method of processing data with bitmask execution.

FIG. 3 depicts an embodiment of a method of data processing with bitmask execution. A bitmask can check for all ads from one STB in a single operation. At step 1101, the panel's report generator retrieves STB reports payload using a "select" SQL (structured query language) query. The next STB report record is obtained at step 1102. At step 1103 the system determines if there are additional STB report records, if there are, the method continues, if not, the method ends. At step 1104, the AMS-L subsystem decodes all events from the STB report payload into RAM and generates at timestamp based bitmask. At step 1005, the AMS-L subsystem retrieves analytics report definitions bitmasks from the local panel configuration database. At step 1107 the system executes an analytics reports bitmask algorithm to the STB report record and stores the results in the panel's report database. At step 1106, the process is repeated for each remaining STB report record.

Using the methods described herein, Event Data 914 stays encoded in STB Reports Database 521 and decoded into RAM by 900 of AMS-L System 108 only during data analysis. By analyzing data in RAM, the system can achieve significant increases in speed of analysis while reducing necessary overall computing power requirements.

While the examples provided herein are for TV viewing systems, the invention is also applicable to other video and audio applications involving an audience, including, but not limited to, video viewing on PCs, tablets, smart phones, game consoles, radio receivers, MP3 players, and other streaming and linear programming devices. Furthermore, the invention is equally applicable to the monitoring of other electronic devices in the environment of an audience member, such as other home appliances.

Although the exemplary environment described herein employs a hard disk database, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Networks may include the Internet, one or more Local Area Networks ("LANs"), one or more Metropolitan Area Networks ("MANs"), one or more Wide Area Networks ("WANs"), one or more Intranets, etc. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising of" includes the terms "consisting of" and "consisting essentially of."

The invention claimed is:

1. A method of generating television analytics Audience Measurement System (AMS) reports, the method comprising the steps of, on a processor:

receiving a plurality of encoded report payloads from a plurality of client devices, wherein each encoded report payload does not include timestamp records;

storing the encoded report payloads in a report payload database;

obtaining data from each of a local advertising database, a local programming database, a local demographics database, and a local panels configuration database;

transferring each encoded report payload from the database into randomly addressable memory (RAM);

decoding each encoded report payload in RAM;

comparing the decoded data in RAM to the data from the local advertising database, local programming database, local demographics database, and local panels configuration database with at least one matching algorithm to determine the occurrence of events from each decoded report payload;

determining a timestamp for each event in RAM;

compiling a database of event occurrences from each of the plurality of decoded report payloads based on the timestamped events; and generating an AMS report from the database of event occurrences.

2. The method of claim 1, wherein the decoded report payload is not saved.

3. The method of claim 1, wherein the step of compiling a database of parsed data from the plurality of encoded report payloads comprises storing the parsed data in one of an intermediate panel report database or a final panel report database.

4. The method of claim 1, wherein an event is at least one of an advertisement was displayed, a TV broadcast was displayed, a button was pressed on a remote control, a biometric recording of a viewer was obtained, or an activation of an interactive element of an advertisement.

5. The method of claim 1, wherein each encoded report payload comprises a client device identifier and a plurality of encoded AMS events.

6. The method of claim 1, wherein the step of parsing the decoded data with at least one matching algorithm to determine the occurrence of events from each encoded report payload is completed via a bitmask algorithm.

7. The method of claim 1, wherein one encoded report payload is parsed before a second encoded report payload is parsed.

8. The method of claim 1, wherein each set of decoded data is parsed for at least one specific event determined by a panel definition.

9. The method of claim 1, wherein the report comprises a count of the number of times a specific event occurred.

10. The method of claim 1, wherein each client device is one of a set top box, a TV, a computer, a tablet, a smartphone, or a streaming media device.

11. The method of claim 1, wherein each encoded report payload is generated without timestamping events.

12. The method of claim 1, wherein each encoded report payload is maintained encoded in the report payload database and is decoded into RAM only during data analysis.

13. The method of claim 12, wherein timestamps are only determined and analyzed in RAM.

14. A system for generating analytics television Audience Measurement System (AMS) reports, comprising:

a processor;

randomly accessible memory (RAM) in communication with the processor;

an encoded reports payloads database in communication with the processor;

a local advertising database, a local programming database, a local demographics database, and a local panels configuration database each in communication with the processor;
a parsed data database in communication with the processor;
a transceiver in communication with the processor; and
software executing on the processor, wherein the software:
receives a plurality of encoded report payloads from a plurality of client devices, wherein each encoded report payload does not include timestamp records;
stores the plurality of encoded report payloads in the encoded reports payloads database;
transfers each encoded report payload from the encoded reports payloads database into RAM;
decodes each encoded report payload in RAM;
compares the decoded data in RAM to the data from the local advertising database, local programming database, local demographics database, and local panels configuration database with at least one matching algorithm to determine the occurrence of events from each decoded report payload;
determines a timestamp for each event in RAM;
compiles a record of event occurrences from each of the plurality of decoded report payloads based on the timestamped events in an event occurrence database; and
generates an AMS report from the data stored in the event occurrence database.

15. The system of claim 14, wherein the decoded report payload is not saved.

16. The system of claim 14, wherein the database of parsed data comprises an intermediate panel report database and a final panel report database.

17. The system of claim 14, wherein an event is at least one of an advertisement was displayed, a TV broadcast was displayed, a button was pressed on a remote control, a biometric recording of a viewer was obtained, or an activation of an interactive element of an advertisement.

18. The system of claim 14, wherein each encoded report payload comprises a client device identifier and a plurality of encoded AMS events.

19. The system of claim 14, wherein the software uses a bitmask algorithm as the matching algorithm.

20. The system of claim 14, wherein one encoded report payload is parsed before a second encoded report payload is parsed.

21. The system of claim 14, wherein each set of decoded data is parsed for at least one specific event determined by a panel definition.

22. The system of claim 14, wherein the report comprises a count of the number of times a specific event occurred.

23. The system of claim 14, wherein each client device is one of a set top box, a TV, a computer, a tablet, a smartphone, or a streaming media device.

* * * * *